United States Patent [19]

Kopatz

[11] Patent Number: 4,557,155
[45] Date of Patent: Dec. 10, 1985

[54] FRICTION GEAR TRANSMISSION

[75] Inventor: Heinz-Dieter Kopatz, Alsdorf, Fed. Rep. of Germany

[73] Assignee: William Prym-Werke KG, Stolberg, Fed. Rep. of Germany

[21] Appl. No.: 558,854

[22] Filed: Dec. 7, 1983

[30] Foreign Application Priority Data

Dec. 8, 1982 [DE] Fed. Rep. of Germany ....... 3245402

[51] Int. Cl.$^4$ .............................................. F16H 15/08
[52] U.S. Cl. ........................................ 74/200; 74/190; 74/199
[58] Field of Search ................. 74/190, 191, 199, 200, 74/201

[56] References Cited

U.S. PATENT DOCUMENTS

| | | | |
|---|---|---|---|
| 1,879,508 | 9/1932 | Robertson | 74/199 |
| 2,336,799 | 12/1943 | Palm | 74/199 X |
| 3,871,239 | 3/1975 | Steinhagen | 74/199 |
| 4,429,585 | 2/1984 | Grant et al. | 74/199 X |

FOREIGN PATENT DOCUMENTS 824593  2/1938  France .................. 74/199

Primary Examiner—Stephen F. Husar
Attorney, Agent, or Firm—Michael J. Striker

[57] ABSTRACT

A friction gear transmission with at least one friction point has a driving gear, a face or bevel gear which is axially force-loaded against the driving gear, a two-part transmission shaft for transmitting a torque to a driven shaft and having an inlet shaft part with a V-shaped curved piece and an outlet shaft part with a V-shaped countercurved piece, an adjusting device for adjusting the transmission ratio and including an adjusting member for radially displacing one of the wheels relative to the other wheel, a supporting element for supporting the transmission shaft, and a sealing element which seals the transmission shaft inner region including V-shaped curved piece and countercurved piece from the supporting element in a lubricant-medium-impermeable manner.

16 Claims, 6 Drawing Figures

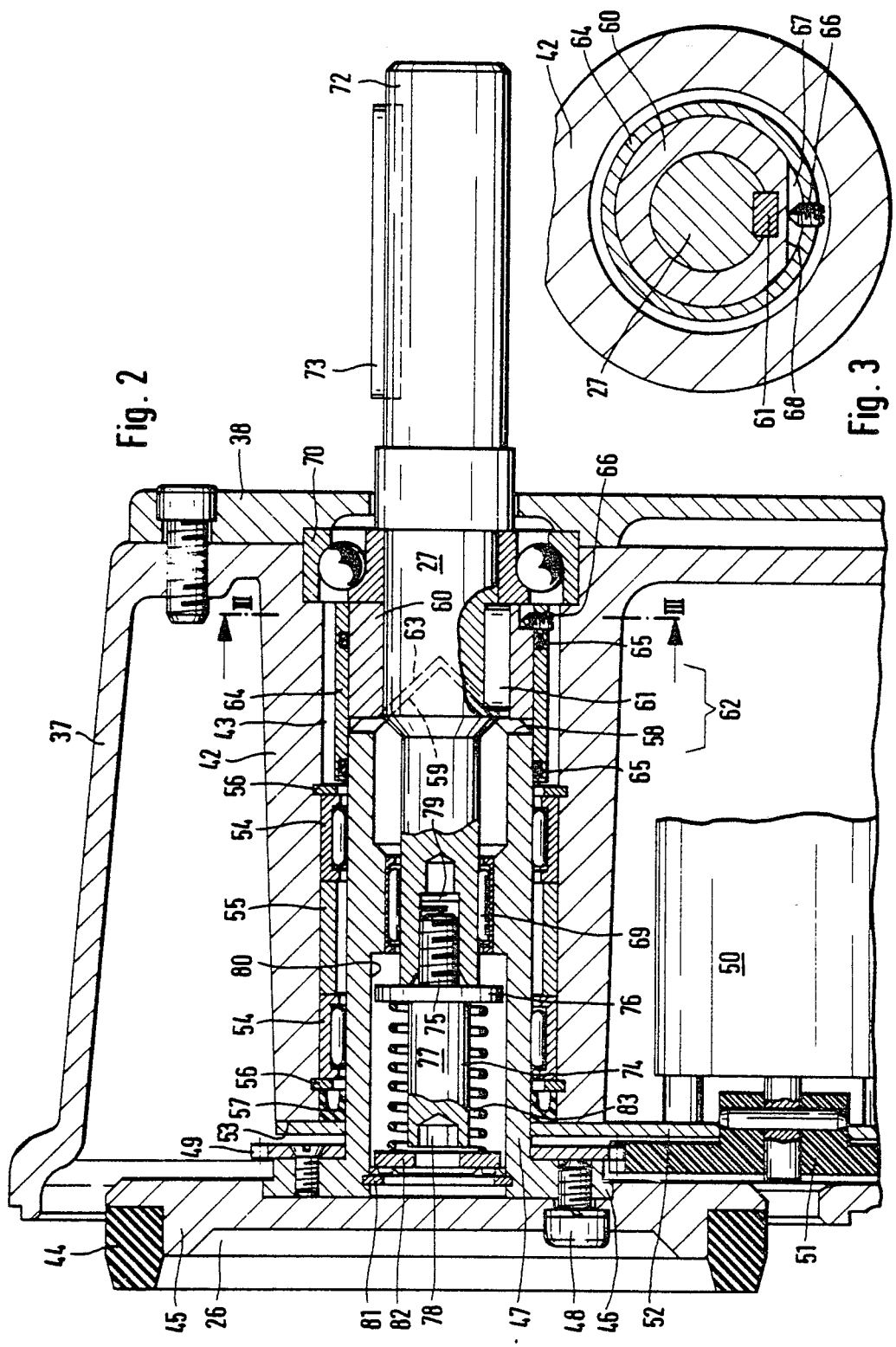

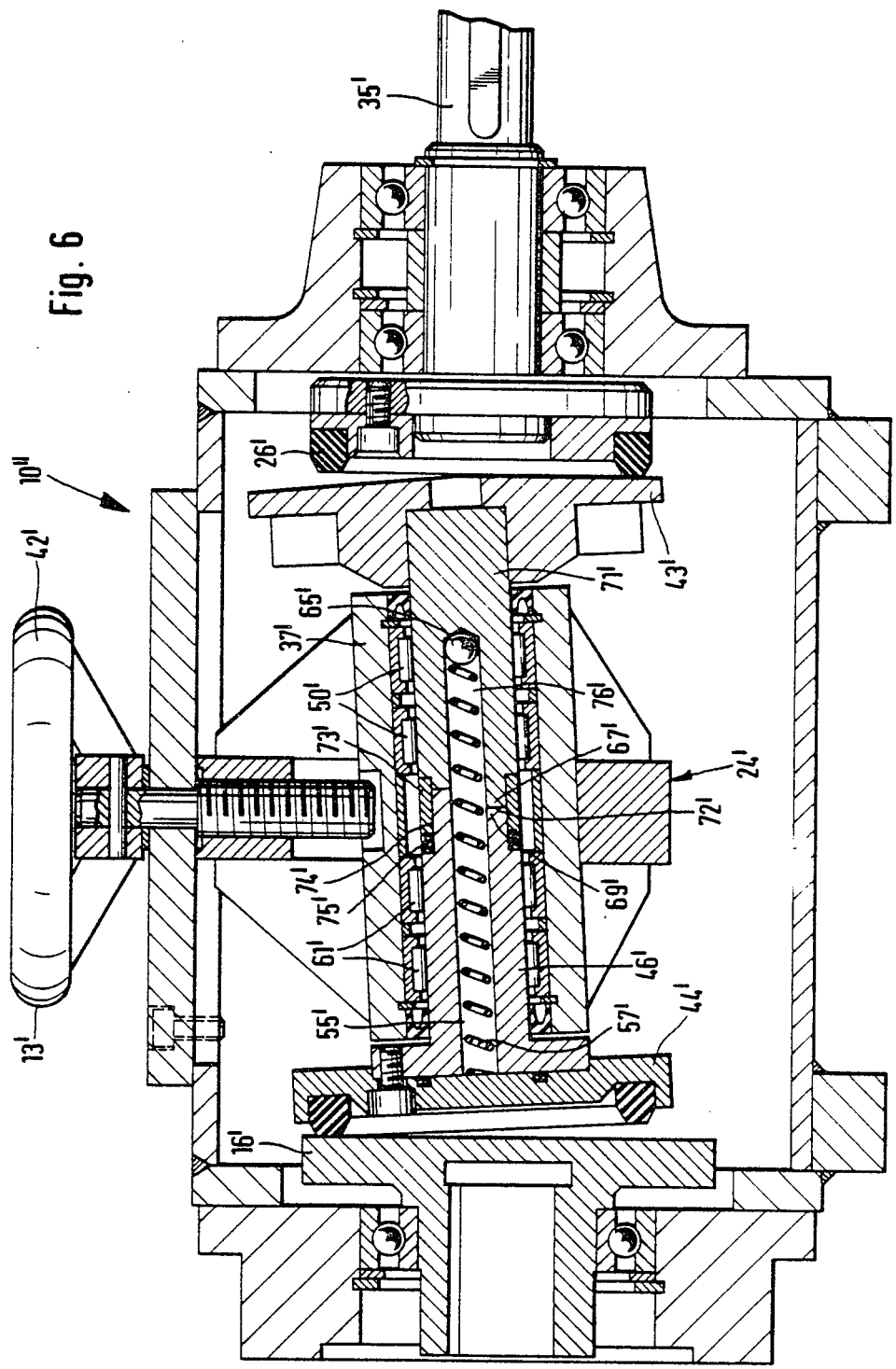

FRICTION GEAR TRANSMISSION

BACKGROUND OF THE INVENTION

The present invention relates to a friction gear transmission.

Friction gear transmissions are known in the art. A friction gear transmission can have only one friction point formed by a bevel gear and a friction gear and acting upon a driven shaft. It can also include a doubled friction gear combination which has two friction points relative to a driving face gear on the one hand and relative to a friction gear leading to a driving shaft on the other hand. Each member of this combination is formed as a double member and moved as a whole, for adjusting the transmission ratio, transverse to the transmission axis. In the known friction transmissions of this type, it is known to provide an axial movement of mutually abutting V-shaped curved piece and countercurved piece because of changing torque withdrawal by the consumer. The axial force produced during transmission of the torque in the transmission takes place by the mutually sliding V-shaped curved pieces, when the driving shaft delivers a torque. Changes in the torque delivery, for example because of a consumer-side imbalance, lead to a changes of this axial force, and thereby to an opposite sliding movement of the V-shaped curves against one another. A vibration movement of the mutually engaging curved pieces takes place. Moreover, this results in a wear at the contact point of the V-shaped pieces, which can lead to a friction corrosion. A lubricating medium introduced between the curved pieces cannot permanently eliminate this danger, inasmuch as the lubricating medium is urged by centrifugal forces during the rotation of the transmission shaft into the outer region of the transmission and therefore is no longer available for lubricating in the region of the V-shaped curved pieces.

SUMMARY OF THE INVENTION

Accordingly, it is an object of the present invention to provide a friction gear transmission which avoids the disadvantages of the prior art.

More particularly, it is an object of the present invention to provide a friction gear transmission which has a lower wear and a higher service life than the known transmissions of this type.

In keeping with these objects and with others which will become apparent hereinafter, one feature of the present invention resides, briefly stated, in a gear transmission of the above described type in which an inner region of the transmission shaft including a V-shaped curved piece and a countercurved piece is closed in a lubricant medium-impermeable manner relative to an outer region including a rotary bearing of the transmission shaft, with the aid of a sealing member.

When the friction gear transmission is designed in accordance with the present invention, the lubricant cannot escape from the inner region of the transmission shaft, even in the event of high centrifugal forces. Instead, it is held in this region and remains at the respective transition point between both parts of the transmission shaft, where the torque is transmitted. The danger of wear and corrosion in the groove region of the transmission is effectively prevented.

The receiving member can be formed in each case where the inlet shaft part and the outlet shaft part of the transmission shaft extend in a bearing pipe, as a sealing sleeve which overlaps the transition zone between the V-shaped curved piece and countercurved pieces. Such a sealing sleeve can be provided at least at its one side with an inner groove, and a sealing ring can engage in this groove to provide an optimal protection against axial escape of the lubricant from the transition zone.

As long as the sealing sleeve is connected with one portion of the transmission shaft in a rotation-transmitting manner, a wear of the sealing sleeve is prevented and no significant loading takes place, which leads to a longer service life of the sealing sleeve. For this rotation-fixed connection, a threaded pin can be used which extends through the wall of the sealing sleeve and engages in a radial flattening of a part of the transmission shaft.

The V-shaped curved pieces of the two-part transmission shaft can be arranged in the region of a blind hole of a hollow shaft. In this case it is advantageous when an O-ring is used as the sealing member and seals the bottom region of the blind hole from the remaining region receiving the rotary bearing.

The transmission shaft and the hollow shaft receiving the same are frequently components of a doubled friction gear combination which is known in the art. The O-ring is an available standard part. The blind hole has a plurality of steps including an end region in which a shaped sleeve forming a part of the transmission shaft is mounted, and the medium axial region which lies before the O-ring and forms a chamber for lubricant.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a view showing a longitudinal section of a driven region of the transmission of FIG. 1, on an enlarged scale;

FIG. 3 is a view showing a radial section taken along the line III—III in FIG. 2;

FIG. 6 is a view showing a longitudinal section of a friction gear transmission in accordance with still a further embodiment of the present invention, with two friction points.

DESCRIPTION OF THE PREFERRED EMBODIMENTS

Figure 1:
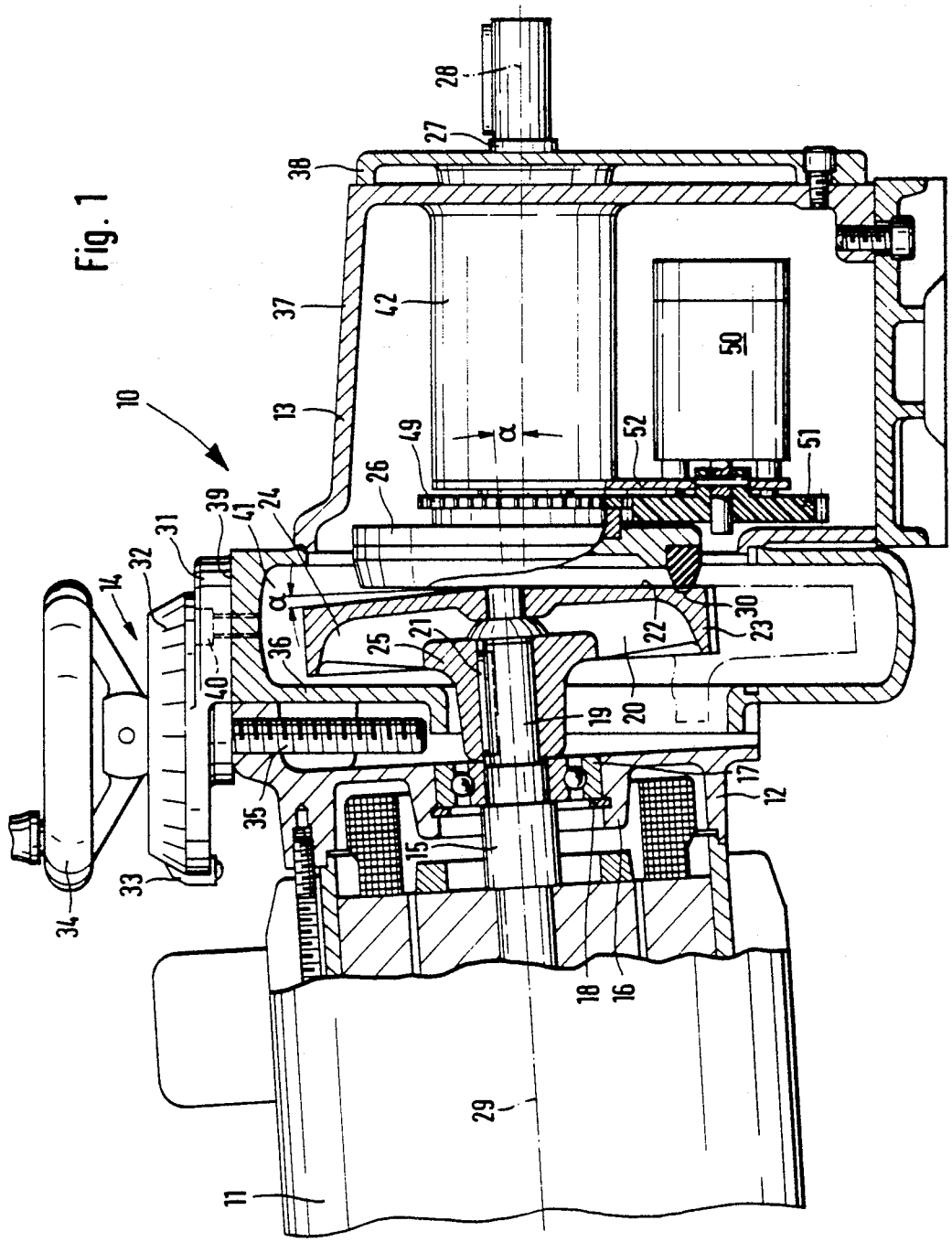
FIG. 1 is a partial section of a friction gear transmission with one friction point, in accordance with the present invention.

The transmission shown in FIG. 1 is identified as a whole with reference numeral 10 and includes a drive motor 11 which is connected via an adjusting flange 12 with a multiple-part housing 13. An adjusting device 14 is arranged on the housing 13.

The motor 11 is connected with the adjusting flange 12 by screws. A motor shaft 15 is supported in a concentrically formed sleeve 16 of the adjusting flange 12. A roller bearing 17 serves for supporting the shaft 15 and is secured by a safety ring 18 against axial displacement in the sleeve 16. A coupling pin 19 is connected with the motor shaft 15 at the location of its support. The coupling pin 19 carries a bevel gear 20 which is held on the pin 19 rotatable therewith by an adjusting spring 21. The bevel gear 20 is formed as a dish-shaped disk with an end surface 22 which is slightly inclined toward the outer periphery. The end surface 22 is limited by a circular collar 23 which is provided with a plurality of diametrically arranged ribs 24 supporting a central hub 25. A friction gear 26 abuts against the end surface 22 of the bevel gear 20 and is arranged for transmitting to a driven shaft 27 a torque supplied from the motor shaft 15. The friction gear 26 and the driven shaft 27 are supported in the multiple-part housing 13.

The friction gear 26 and the driven shaft 27 have an axis 28 which extends horizontally, whereas the motor shaft 15 and the bevel gear 20 have an axis 29 which is inclined at an angle $\alpha$ which is equal to the angle of inclination $\alpha$ of the end surface 22 of the bevel gear 20. Thereby the end surface 22 of the bevel gear 20 extends in a contact region 30 with the friction gear 26 parallel to the same.

The adjusting device 14 allows stepless adjustment of the transmission ratio from the motor shaft 15 to the driven shaft 27. The adjustment is performed via a vertical movement of the adjusting flange 12 together with the motor 11 and the bevel gear 20. Thereby the contact region 30 of the friction gear 26 against the end surface 22 of the bevel gear 20 is changed. When the torque supplied from the motor shaft 15 is taken in the outer peripheral region of the end surface 22 as shown in FIG. 1, a small transmission ratio is obtained. When the torque transmitting point is located more radially inwardly, the transmission ratio increases. This respective location of the adjusting flange 12 of the bevel gear 20 and the motor 11 is shown in FIG. 1 in dash-dot lines.

As mentioned above, the adjusting device 14 moves the adjusting flange 12 vertically. The adjusting device 14 is fixedly connected via a mounting plate 31 with the multiple-part housing 13 which construction will be described hereinbelow. A position indicator including a scale ring 32 and a pointer 33 is arranged on the mounting plate 31. The scale ring 32 is connected with a handle 34 and with a transport spindle 35 engaging in the adjusting spindle 12. By rotation of the handle 34, the adjusting flange 12 is moved downwardly via the transport spindle 35, until the desired transmission ratio is adjusted. At the position of the scale ring 32 relative to the pointer 33, the transmission ratio can be read.

The multiple-part housing includes a guide 36 and a box 37 closable by a cover 38. The guide 36 holds the adjusting flange 12. For this purpose the adjusting flange 12 is provided with a normally extending dovetailed groove which is not shown in detail, whereas the guide 36 is provided with a dovetail projection. The mounting plate 31 of the adjusting device 14 is connected by screws 40 with an upper wall 39 of the guide 36. The guide 36 accommodates in its inner chamber 41 the bevel gear 20. The box 37 is connected with the guide 36. Both parts are connected with one another by screws, not shown in the drawing. The box 37 serves for receiving the friction gear 26 and the driven shaft 27 with its bearing and transmission elements. It is formed as a cast part and has a cylindrical projection 42 with a throughgoing bearing opening 43.

The construction of the driven shaft 27 with its bearing and transmission element is shown in detail in FIG. 2. The friction gear 26 formed as a dish-shaped disk 45 is provided with a race member 44 which abuts in the above described manner against the bevel gear 20. A hollow shaft 47 provided with a flange 46 is connected with the friction gear 26. The connection is performed by screws 48 in the region of the flange, so that the friction gear 26 is connected for joint rotation with the hollow shaft 47. A spur gear 49 is connected by the screws behind the flange 46 of the hollow shaft 47. A gear 51 coupled with a measuring generator 50 engages with the spur gear 49. The measuring generator 50 is flanged on a plate 52 which is held on an end 53 of the cylindrical projection 42 of the box 37.

The hollow shaft 47 is supported by two roller bearings 54, for example needle bearings. A spacer sleeve 55 is arranged between the roller bearings in the bearing opening 43 of the cylidrical projection 42. For axial securing of the roller bearings 54, two safety rings 56 located at both sides of the roller bearings 54 are provided. The bearing opening 43 is closed at its free end 53 by a shaft seal 57 which prevents leakage of lubricating medium. An end 58 of the hollow shaft 47 has a V-shaped curve 59 which cooperates with a V-shaped countercurve 63 of a shaped bush 60. The shaped bush 60 is connected with the driven shaft 27 for joint rotation therewith via an adjusting spring 61. A transition region 62 formed by the V-shaped curves 59 and 63 is overlapped by a sealing sleeve 64. The latter is provided with seals 65, for example O-rings, which abut against the hollow shaft 47 on the one hand and against the shaped bush 60 on the other hand, so as to preclude leakage of the lubricating medium from the transition region 62. The sealing sleeve 64 is fixedly connected with the shaped bush 60.

FIG. 3 shows a cross section through the connection. The fixed connection for joint rotation includes a threaded pin 66 which extends radially through the wall of the sealing sleeve 64 and opens into a depression 67 which is formed by an end-side flattening 68 of the shaped bush 60.

FIG. 2 shows the stepped construction of the driven shaft 27, which is partially received by the hollow shaft 47. The driven shaft 27 is supported with its one end in the hollow shaft 47 in a needle bearing 69. The other bearing point of the driven shaft 27 lies at the end of the bearing opening 43 in the cylindrical projection 42. A ball bearing 70 is provided for this purpose. The box 37 is closed at this side with the cover 38. The driven shaft 27 has a coupling pin 72 which carries an adjusting spring 73 and extends through the cover 38.

The driven shaft 27 has an inner end located in the hollow shaft 47 and is connected with a connecting pin 74 located therein. The connecting pin 74 has a threaded lug 75 which is fixed in a threaded opening 79 of the driven shaft 27. A flange 76 abuts against a free end of the driven shaft 27 and is connected with a cylindrical part 77. The connecting pin 74 has an inner hexagonal hole 78 at an end side of the cylindrical part 77. It performs purely mounting functions and serves for fixing a suitable tool, such as a wrench, to screw the connecting pin 74 into the driven shaft 27.

Hollow shaft 47 has a side facing toward the dish-shaped disk 45 of the friction gear 26 and is provided at this side with a safety ring 81 which is located in an inner opening 80 and abuts against a disk 82. The disk 82 is loaded by a force from a pressure spring 83 abutting against the flange 76 of the driven pin 74. This construction guarantees an axial initial force between the friction gear 26 and the bevel gear 20, the force being independent of the torque transmission. The inherent axial force during torque transmission is produced by the inclined course of the mutually contacting V-shaped curves 59 and 63 which displace relative to one another. The axial force increases with the increased torque transmission and leads to a continuous displacement of the V-shaped curves, which always a lubricating medium is present because of the sealing sleeve 64.

The force-transmitting connection during the torque transmission takes place in the following manner: The torque supplied from the motor 11 is transmitted via the motor shaft 15 to the bevel gear 20. From the end surface 22 of the bevel gear 20 and pick-up takes place through the spring-loaded friction gear 26 which is connected for joint rotation with the hollow shaft 47. Because of the V-shaped curve 59 provided at the end 58 of the latter, the shaped bush 60 becomes involved in rotation via the complementary countercurve 63. Since the shaped bush 60 is seated in a rotation-transmitting manner on the driven shaft 27, the torque is therefore transmitted to the driven shaft 27.

In this embodiment, the number of V-shaped curves 59 and 63 can be increased. Also, the mounting of the sealing sleeve 64 can be carried out by several and different mounting means.

Figure 4:
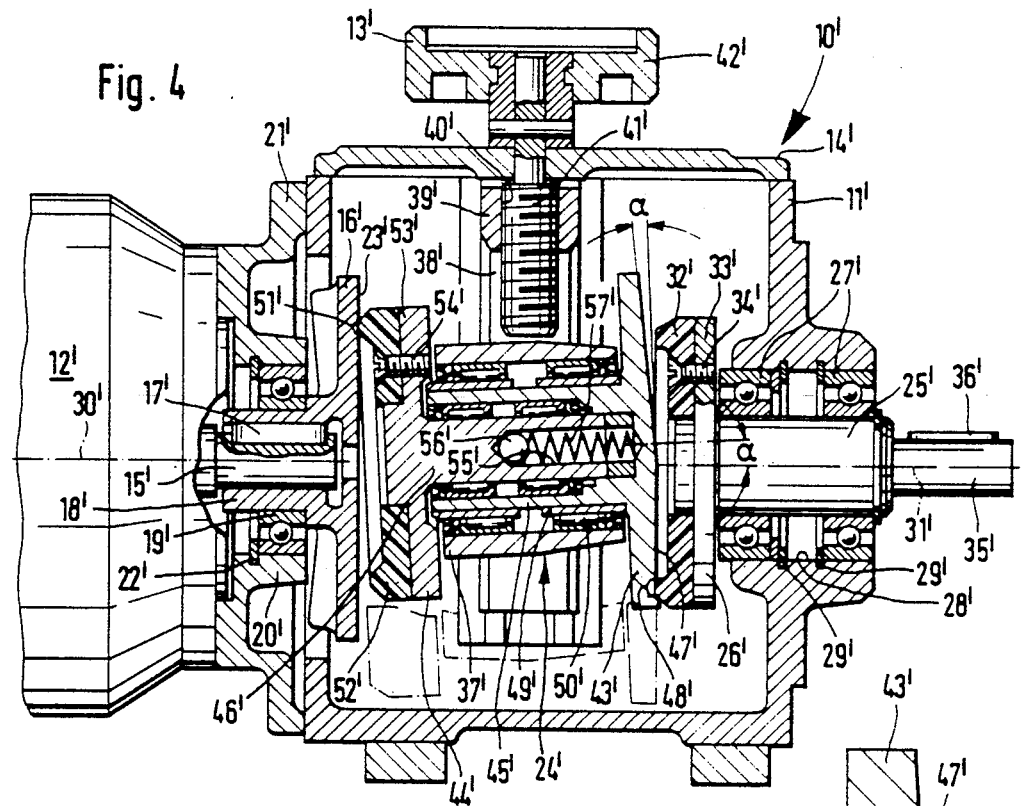
FIG. 4 is a view showing a longitudinal section of a friction gear drive in accordance with another embodiment of the present invention, with two friction points.
Figure 5:
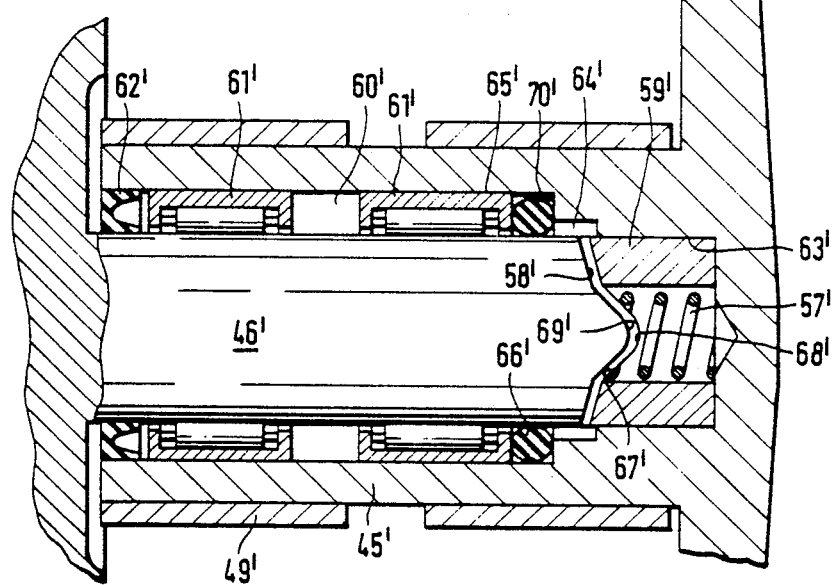
FIG. 5 is a view showing a longitudinal section of the friction gear transmission of FIG. 4, on an enlarged scale.

The transmission shown in FIGS. 4 and 5 has parts which are identified with reference numerals similar to the reference numerals in FIGS. 1-3 with the addition of primes. The transmission 10' with two friction points has a multiple-part housing 11'. A flange 21' with a driven motor 12' is located at its one side, whereas an adjusting device 13' is mounted at its upper side. The driven motor 12' drives via motor 15' a face gear 16'. The latter is held for joint rotation on the driven shaft 15' via an adjusting spring 17'. The face gear 16' has a cylindrical projection 18' which extends to the left and supports a roller bearing 19'. The roller bearing 19' is supported in a centric sleeve 20' of a flange 21'. A safety ring 22' precludes an axial displacement of the bearing 19' inside the sleeve 20'.

At an end surface 23' of the face gear 16', the torque supplied from the motor shaft 15' is transmitted via a bevel-friction gear combination 24' to a driven gear 26'. The driven gear 26' includes a ring-shaped friction coating 32' which is mounted on a disk flange 33' of a driven shaft 25' by screws 34'. The driven shaft 25' is supported in a bearing opening 28' of the housing 11'. For its support, there are provided two rotor bearings 27' which are located one behind the other and axially fixed in the opening 28' by two safety rings 29'. The driven shaft 25' ends with a coupling pin 35' extending outwardly of the housing 11' and carrying an adjusting spring 36'. An axis 30' of the motor shaft 15' and an axis 31' of the driven shaft 25' are horizontal and aligned with one another.

The bevel-friction gear combination 24' is supported in a respectively formed sleeve 37' of a downwardly open guide frame 38'. The guide frame 38' can be vertically adjusted by the adjusting device 13' for changing the transmission ratio.

For this purpose the guide frame 38 has a threaded opening 40' which is provided in its upper web 39' and serves for receiving a transporting spindle 41' provided in the adjusting device 13'. The transporting spindle 41' is axially fixed relative to the housing 11' and is actuated by a handle 42'. FIG. 4 shows the uppermost position of the guide frame 38'. In this position the minimum transmission is obtained. When the guide frame 38' is brought to the position shown in dash-dot lines, the transmission ratio is correspondingly increased. The guide frame 38' is vertically guided in the housing 11' by a dovetailed guided which is not shown in detail. The bevel-friction gear combination 24' includes a friction wheel 44' which is located at the left in FIG. 4, and a level gear 43' which is located at the right. The bevel gear 43' has an end surface 47' which is inclined to the outer periphery and has a hollow shaft 45'. A trunnion 46' of the friction gear 44' is rotatably supported in the hollow shaft 45'. The end surface 47' of the bevel gear 43' serves for torque transmission to the driven gear 26' of the driven shaft 25'. Since the inclination of the end surface 47' has an angle which is equal to the angle of the inclined sleeve 37' of the guide frame 38', the end surface 47' in its driven region 48' extends parallel to the driven wheel 26' of the driven shaft 25'. Two slide rings 49' are arranged one behind the other on the hollow shaft 45', and two needle bearings 50' are seated on the slide rings so as to support the bevel gear 43' in the sleeve 37'.

The friction gear 44' located at the left side receives the torque supplied from the motor shaft 15'. It is provided at its driven surface 51' with a friction ring 52' which is mounted by screws 54' on a disk 53' connected with the trunnion 46'.

The trunnion 46' of the friction gear 44' is provided with a concentric blind hole 55' which is formed for receiving a ball 56' and a pressure spring 57' abutting against the latter. The pressure spring 57' supports with its other end on the bottom of a blind hole 60' of the hollow shaft 45' of the bevel gear 43'. The pressure spring allows a limited axial relative movement between the friction gear 44' on the one hand and the bevel gear 43' on the other hand.

An end side 58' of the trunnion 56' of the friction gear 44' has a profile which cooperates in a rotation-transmitting manner with a shaped sleeve 59' connected with the bevel gear 43'.

FIG. 5 shows on an enlarged scale the bevel gear 38' and the shaped sleeve 59', wherein the trunnion 46' of the friction gear 44' is not sectioned. Here the shape of the profiling is clearly recognizable. The shaped sleeve 59' has two oppositely located V-shaped curved pieces 67' rounded in an apex region 68'. The trunnion 46' is provided at its end side 58' with two complementary V-shaped curved pieces 69'. During sliding of the V-shaped curved pieces 67' and 69' on one another, the required axial force for transmission of the rotary movement between the friction gear 44' and the bevel gear 43' is produced, so that always in the driven region 48' of the face disk 16' on the one hand, and on the driven surface 51' of the driven gear on the other hand, a constant friction pressure is guaranteed.

For obtaining of rotation-transmitting connection between the bevel gear 43' and the shaped sleeve 69', it is pressed into the end region of the blind hole 60' of the hollow shaft 45'. The blind hole 60' is multiply-stepped. In its bottom-side end region 63', it has a portion with a minimum diameter. This portion which is identified with reference numeral 63' serves, as mentioned above, for receiving the shaped sleeve 59'. A median portion 64' connected with the first-mentioned portion accommodates the transmission region performed by the end-side profile on the trunnion 46' and the shaped sleeve 59'. This portion 64' is sealed by a sealing ring 66', for example an O-ring, from a remaining portion 65' of a maximum diameter. The sealing ring 66' abuts against a radial abutment surface 70' which forms different diameters for the median portion 64' and the remaining portion 65'.

This guarantees that sufficient lubricating medium is always available in the transmission region. The V-shaped curved pieces 67' and 69' of the trunnion 46' and the shaped sleeve 59' are thereby protected against premature wear or corrosion. The remaining portion 65' serves for receiving the trunnion 46' which is rotatably supported in two needle bearings 61' arranged one behind the other. For eliminating lubricant leakage, this remaining portion 65' is closed by a sealing ring 62' seated on the trunnion 46'.

The power flux during the torque transmission can be recognized in connection with FIG. 4; the torque supplied from the motor 12' is transmitted via the motor shaft 15' to the face gear 16'. Here it is picked up via the friction gear 44', wherein the vertical position of the friction gear 44' determines the transmission ratio. Via the end disk side V-shaped curve of the trunnion 46' connected with the friction gear 44', the shaped sleeve 59' is driven in rotation. Since it is fixedly mounted on the bevel gear 43', the torque can be transmitted from the end surface 47' of the bevel gear 43' to the driven gear 26'. The driven gear 26' is connected in rotation-transmitting manner with the driven shaft which supplies the torque to the consumer.

As mentioned hereinabove, the drawings show only exemplary embodiments of the invention and do not limit the invention in any way. Thus, it is feasible to select instead of the shown sealing ring 66' a sealing ring which has a different cross section. It will also not influence the present invention when the location-fixed connection between the shaped sleeve 59' and the bevel gear 43' is formed as a pin or screw connection, or the shaped sleeve 56' has a circumferential grooved toothing. It is also possible to change the bevel-friction gear combination so that the friction gear 44' located at the left is supported by the hollow shaft, whereas the bevel gear 43 located at the right is designed with the trunnion.

The above mentioned opening 55' in the center of the trunnion 46' serves as grease chamber for receiving the lubricating medium; thereby it can be supplied better from this chamber to the V-shaped pieces 67' and 69'. By extension of this axial opening 55=, the grease chamber can be respectively increased. There can be the following structural alternatives which are shown in FIG. 6:

FIG. 6 shows a friction gear transmission 10" with two friction points 16', 44' and 43', 16' which have been used in connection with the embodiments of FIGS. 4 and 5. In FIG. 6 the parts which are analogous to the parts of FIGS. 4 and 5 are identified with the same reference numerals. This is also true with respect to the description. It suffices to describe in connection with FIG. 6 only it distinctive features.

In FIG. 6 both the friction gear 44' and the bevel gear 43' are provided with a trunnion 46' or 71' which abut against one another in the medium of the combination 24' and have there the V-shaped curved piece and countercurved piece 69' and 67' respectively. It can be seen that the gap 72' is provided between them in FIG. 6. Those trunnions 46' and 71' are supported via needle bearings 50' and 61' in the sleeve 37' which is displaceable by the handle 42' of the adjusting device 13'.

The trunnions 46' and 71' are provided in their end regions facing toward one another with a projection. A sealing member formed as a sealing sleeve 73' is arranged in this region. The sealing sleeve 73' is fixed with its one end to the trunnion 71' by gluing or shrinking; however, the end-side projection of the other trunnion 46' is movable in the sealing sleeve. The inner surface of the sealing sleeve 73' is sealed from an outlet surface 74' of the trunnion 46' by an inner sealing ring 75'. Thereby in this embodiment the inner region with both curved pieces 69' and 67' is closed from the bearings 60' and 61'.

In this case not only the trunnion 46' of the friction gear 44' has the axial opening 55', but also the trunnion 71' of the bevel gear 43' is provided with an axial opening 76'. The axial openings 55' and 76' are in alignment with one another and accommodate the pressure spring 57' and the ball 56'. The pressure spring 57' and the ball 56' are provided for axially pressing both trunnions 46' and 71' away from one another, so that, regardless of the connected rotary load, an initial pressure is produced at both friction points 16', 44' and 43', 26'. The coordinated axial openings 55' and 76' serve as a receiving chamber for the lubricant which lubricates the curved pieces 69' and 67' rotatable relative to one another, in a load-independent manner.

It will be understood that each of the elements described above, or two or more together, may also find a useful application in other types of constructions differing from the types described above.

While the invention has been illustrated and described as embodied in a friction gear transmission, it is not intended to be limited to the details shown, since various modifications and structural changes may be made without departing in any way from the spirit of the present invention.

Without further analysis, the foregoing will so fully reveal the gist of the present invention that other can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A friction gear transmission with at least one friction point, comprising a driven gear; a friction gear which is axially force-loaded against said driving gear; a driven shaft to which a torque is to be transmitted; and a two-part transmission shaft for transmitting the torque to said driven shaft, said transmission shaft having an inlet shaft part with an end provided with a V-shaped curved piece, and an outlet shaft part with an end provided with a V-shaped countercurved piece, said transmission shaft having an inner region in which said V-shaped curve and countercurve pieces are provided and an outer region; means for adjusting the transmission ratio of said gears and operative for radially displacing one of said gears relative to the other of said gears; means for rotatably supporting said transmission shaft and arranged in said outer region; and means for sealing in a lubricant medium-impermeable manner said inner region provided with said V-shaped curved and countercurved pieces from said outer region provided with said rotatably supporting means for supporting said transmission shaft.

2. A friction gear transmission as defined in claim 1, wherein said driving gear is formed as a face gear.

3. A friction gear transmission as defined in claim 1, wherein said driving gear is formed as a bevel gear.

4. A friction gear transmission as defined in claim 1, wherein said sealing means is formed as a sealing member.

5. A friction gear transmission as defined in claim 1; and further comprising a bearing pipe in which said inlet shaft portion and said outlet portion of said transmission shaft extend, said V-shaped curved piece and countercurved piece of said transmission shaft forming a transition zone, and said sealing means including a sealing sleeve which overlaps said transition zone in a lubricant-medium-impermeable manner.

6. A friction gear transmission as defined in claim 5, wherein said sealing sleeve has two ends and is provided at at least one of said ends with an inner groove, said sealing means also including a sealing ring accommodated in said inner groove of said sealing sleeve.

7. A friction gear transmission as defined in claim 5, wherein said sealing sleeve is connected with said transmission shaft in a rotation-transmitting manner.

8. A friction gear transmission as defined in claim 7, wherein said transmission shaft has an outlet part, said sealing sleeve being connected with said outlet part of said transmission shaft in a rotation-transmitting manner.

9. A friction gear transmission as defined in claim 7, wherein said sealing sleeve has a wall; and further comprising connecting means for connecting said sealing sleeve with said transmission shaft, said connecting means including a threaded pin extending through said wall of said sealing sleeve, and a depression formed in said transmission shaft as a radial flattening and arranged so that said threaded pin engages in said depression.

10. A friction gear transmission as defined in claim 1; and further comprising a hollow shaft which has an end portion provided with a blind hole which accommodates said V-shaped curved piece and countercurved piece of said transmission shaft, and a remaining portion which accommodates said supporting means, said sealing means inluding a sealing member which seals said blind hole from said remaining portion of said hollow shaft in a lubricant-medium-impermeable manner.

11. A friction gear transmission as defined in claim 10, where said sealing member is formed as an O-ring surrounding said transmission shaft.

12. A friction gear transmission as defined in claim 11, wherein said transmission shaft has an inlet part, said O-ring being arranged on said inlet part of said transmission shaft.

13. A friction gear transmission as defined in claim 10, wherein said transmission shaft is received in said hollow shaft, said transmission shaft and said hollow shaft being formed as components of a doubled friction gear combination which has two ends each provided with said friction point.

14. A friction gear transmission as defined in claim 13, wherein said double friction gear combination has an axis, said adjusting means being formed so as to displace said doubled friction gear combination as a whole in a direction transverse to said axis.

15. A friction gear transmission as defined in claim 11, wherein said blind hole of said hollow shaft is stepped and forms a radial abutment surface for said O-ring.

16. A friction gear transmission as defined in claim 10, wherein said transmission shaft has an inlet shaft part and an outlet shaft part formed as a shaped sleeve, said blind hole being stepped and including an end portion for mounting said shaped sleeve of said transmission shaft, an axial medium portion for receiving a lubricating medium and closed by said sealing member, and a further portion for supporting said inlet shaft part of said transmission shaft.

* * * * *